A. S. HUBBARD.
ALTERNATING CURRENT APPARATUS.
APPLICATION FILED JAN. 28, 1910.
1,160,610.
Patented Nov. 16, 1915.
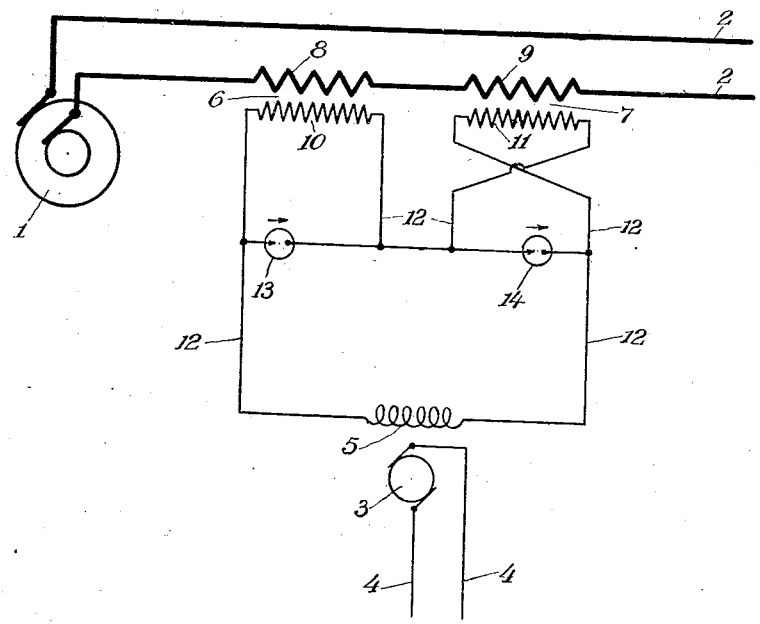
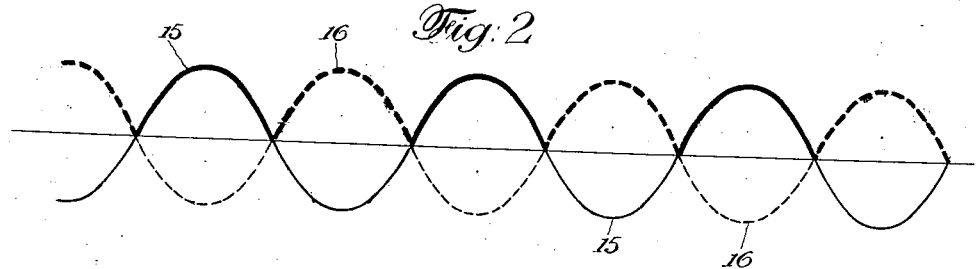
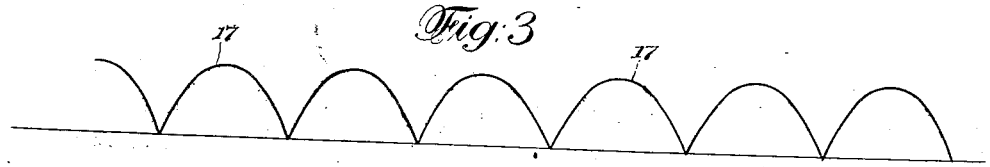
Witnesses:
W. A. Hutton
John O. Gempler
Inventor
Albert S. Hubbard
By his Attorneys
Kenyon & Kenyon

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ALTERNATING-CURRENT APPARATUS.

1,160,610.  Specification of Letters Patent.  Patented Nov. 16, 1915.

Original application filed August 7, 1909, Serial No. 511,682. Divided and this application filed January 28, 1910. Serial No. 540,488.

*To all whom it may concern:*

Be it known that I, ALBERT S. HUBBARD, a citizen of the United States, and a resident of Belleville, Essex county, State of New Jersey, have invented certain new and useful Improvements in Alternating-Current Apparatus, of which the following is a specification.

This application is a division of my prior co-pending application No. 511,682, filed August 7, 1909.

My invention relates to the art of producing direct current from alternating currents and more especially to an improved method and means for producing pulsating direct currents from alternating currents.

One object of my invention is to provide a method and arrangement for doing this in a manner which is extremely simple and which involves a minimum loss of energy so that the efficiency thereof is very great.

My improvements are also economical in both construction and operation.

Further objects, features and advantages will more clearly appear from the detailed description given below taken in connection with the accompanying drawing which shows a preferred embodiment of my improvements.

In the drawing, Figure 1 shows diagrammatically an arrangement embodying one form of my improvements. Fig. 2 is a diagram representing the voltages applied in the auxiliary circuit 12 of Fig. 1. Fig. 3 is a diagram of curves representing the current in said circuit.

Referring to Fig. 1, 1 represents a main alternating current generator feeding a single phase alternating current circuit 2, 2. At 3 I have shown a dynamo electric machine connected to a circuit 4, 4, which machine is provided with a field 5 which is designed to be supplied with a pulsating unidirectional current. At 6 and 7 I have shown series transformers having their primaries 8 and 9 respectively connected in series in the circuit 2, 2. The secondaries 10 and 11 respectively of these transformers are connected in series with the field 5 in a circuit 12. Connected across the secondary 10 is an asymmetric cell or aluminum rectifier 13 and connected across the transformer 7 is an asymmetric cell or aluminum rectifier 14. The secondaries 10 and 11 are oppositely connected in the circuit 12, so that the normal electromotive forces which they produce will oppose one another.

The aluminum rectifier 13 being connected directly across the terminals of the secondary 10 it will thus short-circuit said secondary when the voltage produced therein is in one direction but will not short-circuit the same when the voltage is in the other direction. This is due to the nature of the rectifier 13, which is of that type which allows a current to pass through it in one direction but not in the other. In a similar manner the rectifier 14 will short-circuit the secondary 11 of the transformer 7 when its voltage is in one direction but will not be short-circuited when its voltage is in the other direction. Thus the voltages produced by the secondaries of these transformers will be substantially eliminated when in one direction but not in the other. The voltages produced by these transformers in the circuit 5, 12, may be represented by the curves shown in Fig. 2, in which the solid line curve 15 represents the voltage produced by the transformer 6 and the dotted line curve 16 represents the voltage produced by the transformer 7. Assuming that the upper portions of these curves are positive and the lower portions negative, the rectifier 13 will short-circuit the transformer 6 at those periods of time represented by the lighter or negative portions of the curve 15, so that at those periods of time the secondary 10 being short-circuited the transformer 6 will produce no current in the circuit 12. The transformer 7 being oppositely connected to the circuit 12 with respect to the transformer 6, the electromotive force produced by its secondary 11 in the circuit 12 will be positive at those times when the electromotive force of the transformer 6 is negative and vice versa. In a similar manner the rectifier 14 short-circuits the secondary 11 when its electromotive force is negative but not when its electromotive force is positive, so that the transformer 7 will produce no current in the circuit 12 during those periods of time represented by the light dotted lines 16. It will thus be apparent that the transformers 6 and 7 with the aluminum rectifiers 13 and 14 produce a current in the circuit 12, in which the lower or negative portions are eliminated and in which only the upper or positive portions are maintained, the result being that a uni-directional pulsating current, as represented by the curve 17, in Fig. 3, is produced in the circuit 12. Thus a pulsating uni-directional current is produced within the field 5 for exciting the machine 3, or if desired, the pulsating uni-directional current in the circuit 12 may be utilized for any other desired purpose.

In my co-pending application above referred to, the machine 3 was a booster for regulating the action of the storage battery connected to compensate for changes of load on the alternating current circuit 2, 2. In this manner the booster was regulated to cause the battery to charge and discharge in accordance with load fluctuations on the circuit 2, 2, but only at those times when the main generator 1 was furnishing load thereto. That is, the battery was caused to pump energy in a line in phase with the alternations of the main generator 1.

Since the power utilized in the circuit 12 is not large the aluminum rectifiers 13 and 14 form substantially simple and economical means for cutting out one-half of the alternating current wave. The short-circuiting of the secondaries 10 and 11 does not cause any appreciable increase in the current in the primaries 8 and 9 because the current in the circuit 2, 2 is maintained substantially constant by the load thereon or by the inclusion of the other transformer in series therewith, since only one of the transformers 6 and 7 is short-circuited at any given time.

From the above it will appear that by my improved method and arrangement pulsating uni-directional currents may be produced in a most simple manner and most efficiently and economically, since the energy used in the rectifiers 13 and 14 is practically nothing. This is so since they practically short-circuit the transformer secondaries 10 and 11 so that there is practically no power utilized in the short-circuit.

Although I have described my improvements in great detail nevertheless I do not desire to be limited thereto except as specified hereinafter in the appended claims, since many changes and modifications may well be made by those skilled in the art without departing from the spirit and scope of my invention. But Having fully and clearly described my improvements what I claim and desire to secure by Letters Patent, is:

1. The combination of a circuit to be energized, a one-phase series transformer having its secondary connected to said circuit to energize the circuit, and an asymmetric cell automatically short-circuiting said secondary when the voltage produced therein is in one direction but not when the voltage produced therein is in the other direction whereby said circuit is energized with a uni-directional current.

2. The combination of a circuit to be energized, two series transformers having their secondaries connected in a series with said circuit to energize the circuit, the connections being such that the voltage in one secondary is opposite to that of the other, and an asymmetric cell for short-circuiting one secondary during one wave and the other secondary at another time, whereby said circuit is supplied with a uni-directional current from said transformers.

3. The combination of a series transformer, a circuit connected to the secondary of the transformer to be energized therefrom, and an asymmetric cell substantially short-circuiting said secondary during one wave and not during the other wave in the secondary.

4. The combination of a circuit to be energized, two series transformers connected in series in the same circuit and having their secondaries connected in series with said circuit to be energized, the secondary of one transformer being connected opposite to that of the other, and asymmetric cells for short-circuiting one secondary during one wave and the other secondary during the other wave, whereby said circuit to be energized is supplied with the uni-directional current from said transformers.

In testimony whereof, I have signed my name to this specification, in the presence of two subscribing witnesses.

ALBERT S. HUBBARD.

Witnesses:
GORHAM CROSBY,
EDWIN SEGER.